US009882450B2

(12) United States Patent
Yaguchi et al.

(10) Patent No.: US 9,882,450 B2
(45) Date of Patent: Jan. 30, 2018

(54) ROTATION ACTUATOR

(71) Applicant: Harmonic Drive Systems Inc., Shinagawa-ku, Tokyo (JP)

(72) Inventors: Daisuke Yaguchi, Azumino (JP); Kiyoto Kobayashi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 15/315,629

(22) PCT Filed: Jun. 2, 2014

(86) PCT No.: PCT/JP2014/064606
§ 371 (c)(1),
(2) Date: Dec. 1, 2016

(87) PCT Pub. No.: WO2015/186172
PCT Pub. Date: Dec. 10, 2015

(65) Prior Publication Data
US 2017/0194832 A1 Jul. 6, 2017

(51) Int. Cl.
*F16H 1/28* (2006.01)
*H02K 7/116* (2006.01)
*H02K 1/27* (2006.01)
*H02K 7/08* (2006.01)

(52) U.S. Cl.
CPC .............. *H02K 7/116* (2013.01); *F16H 1/28* (2013.01); *H02K 1/2706* (2013.01); *H02K 7/08* (2013.01)

(58) Field of Classification Search
CPC ....................................................... H02K 7/08
See application file for complete search history.

(56) References Cited

U.S. PATENT DOCUMENTS 6,520,483 B1    2/2003   Miyoshi et al.

FOREIGN PATENT DOCUMENTS

| JP | 2001-072358 A | 3/2001 |
| JP | 2004-129374 A | 4/2004 |
| JP | 2012-036910 A | 2/2012 |

OTHER PUBLICATIONS

International Search Report (PCT/ISA/210) dated Aug. 19, 2014, by the Japanese Patent Office as the International Searching Authority for International Application No. PCT/JP2014/064606.

*Primary Examiner* — Derek D Knight
(74) *Attorney, Agent, or Firm* — Buchanan Ingersoll & Rooney PC

(57) ABSTRACT

A rotation actuator is equipped with a motor and a reduction gear disposed adjacent to each other. Both shaft end portions of a rotating shaft, which passes through the center of the motor and reducer, are rotatably supported through first and second rolling bearings by first and second fixed discs that are mutually fastened and fixed. A rotation output plate is supported through a third rolling bearing in the outer peripheral surface of the second fixed disc. A sliding ring is mounted between the rotation output plate and the first fixed disc. The sliding ring functions as a thrust bearing for the rotation output plate and also functions as a sealing mechanism for preventing grease from flowing from the reducer gear to the outside. A flat rotation actuator can be achieved.

4 Claims, 2 Drawing Sheets

(a)

ROTATION ACTUATOR

TECHNICAL FIELD

The present invention relates to a rotation actuator provided with a motor and a reduction gear, and particularly relates to a rotation actuator having a flat structure of small dimensions in the center axis direction.

BACKGROUND ART

Rotation actuators having a flat structure have been proposed in Patent Documents 1 and 2. The rotation actuators (motor with reduction gear) described in these documents are composed of a flat outer-rotor-type motor and a flat epicyclic reduction gear disposed adjacent thereto.

In Patent Document 1, a motor rotating shaft and a reduction gear output shaft are coaxially disposed, the motor rotating shaft is supported by a pair of roller bearings, and the reduction gear output shaft is supported by a cylindrical sliding bearing. In Patent Document 2, a sun gear of an epicyclic reduction gear is formed on the external peripheral surface of the leading-end part of a motor rotating shaft. The motor rotating shaft is supported by a pair of ball bearings and the leading-end part positioned on the reduction gear side thereof is supported by a single ball bearing.

In Patent Document 2, a reduction gear carrier, which is a rotation output member, is supported by a gear base and motor base on the fixed side via a plurality of thrust bearings. The thrust applied to the carrier is thereby borne by the fixed-side members.

RELATED ART DOCUMENTS

Patent Documents

Patent Document 1: JP A 2004-129374
Patent Document 2: JP A 2012-36910

SUMMARY OF THE INVENTION

Problems to be Solved by the Invention

As shown in Patent Documents 1 and 2, the rotating shaft is supported on the motor side by a pair of bearings disposed adjacent to each other in the center axis direction in the rotation actuator. Provided that the number of bearings of the rotating shaft can be reduced, the dimension in the center axis direction of the motor portion can be reduced, which is advantageous for flattening the rotation actuator.

As shown in Patent Document 2, a plurality of thrust bearings are disposed in order to receive the thrust that acts on the rotation output member. It would be advantageous for flattening a rotation actuator if the thrust could be supported by a small, compact bearing mechanism.

Furthermore, a seal mechanism is incorporated in a rotation actuator so that grease does not flow out from the reduction gear to the exterior. It would be advantageous for flattening a rotation actuator if the outflow of grease could be prevented by a small, compact seal mechanism.

In view of the above, an object of the present invention is to provide a flat rotation actuator in which an inner-rotor-type motor is used.

Means to Solve the Problems

In order to solve the problems described above, a rotation actuator of the present invention is characterized in comprising:

a first fixed member and second fixed member fixed to each other across a predetermined gap in the direction of a center axis direction;

a space formed between the first and second fixed members;

a rotating shaft that passes through the first fixed member in the center axis direction, a leading-end part thereof extending to the second fixed member;

a first bearing mounted between the first fixed member and the rotating shaft, the first bearing rotatably supporting the rotating shaft on the first fixed member;

a second bearing mounted between the second fixed member and the leading-end part of the rotating shaft, the second bearing rotatably supporting the rotating shaft on the second fixed member;

a motor rotor fixed to a trailing-end part of the rotating shaft, the trailing-end part protruding from the first fixed member toward a side opposite to the second fixed member;

a motor stator fixed to a section of the first fixed member, the section being located on an opposite side from the second fixed member, and the motor stator surrounding an external periphery of the motor rotor across a fixed gap;

a rotation output member for surrounding an external periphery of the second fixed member;

a third bearing mounted between the second fixed member and the rotation output member, the third bearing rotatably supporting the rotation output member on the second fixed member; and a reduction gear mechanism incorporated between the first fixed member and the second fixed member, the reduction gear mechanism reducing a rotation of the rotating shaft and transmitting a reduced rotation to the rotation output member.

In the rotation actuator of the present invention, first, and second fixed members are fixed to each other across a predetermined gap in the center axis direction, motor-constituting components (the motor rotor and motor stator) are assembled to the first fixed member on the opposite side from the second fixed member, and a reduction gear mechanism is incorporated between the first and second fixed members. A rotating shaft that passes through the center portion of the mutually fixed first and second fixed members is supported by the first and second fixed members. The rotating shaft is supported at two points; i.e., the reduction gear-side portion and the motor-side portion, which are set apart in the center axis direction. The first and second fixed members are fixed to each other and are capable of supporting the rotating shaft with high supporting force. Hence, the rotating shaft is not required to be supported on the motor side using a plurality of bearings, and the center-axis-direction dimension of the rotation actuator can be reduced.

In the present invention, a planetary gear mechanism can be used as the reduction gear mechanism. The reduction gear mechanism in this case has:

a sun gear formed on the external peripheral surface of the rotating shaft on a shaft portion positioned between the first and second fixed members;

a planetary gear that is rotatably supported between the first and second fixed members by a planetary shaft that spans the space therebetween, the planetary gear meshing with the sun gear; and an internally toothed gear that is positioned between the rotation output member and the first fixed member, is fixed to the rotation output member, and meshes with the sun gear.

In the present invention, it is desirable to provide a sliding bearing in order to bear the thrust that acts on the rotation output member, the sliding bearing being mounted between the rotation output member and the first fixed member, and the rotation output member being rotatably supported by the first fixed member in the center axis direction. The sliding bearing is smaller and more compact than a common rolling thrust bearing, and is therefore advantageous for flattening a rotation actuator In this case, the sliding bearing is preferably a sliding ring that is slidably mounted in the gap between the rotation output member and the first fixed member so as to surround the internally toothed gear and seal the gap.

The sliding ring functions as a sliding bearing and also functions as a seal mechanism for preventing outflow of grease. This is more advantageous for flattening a rotation actuator than separately arranging the sliding bearing and the seal mechanism.

In the present invention, a cylindrical portion that protrudes toward a side opposite to the second fixed member is formed on the external peripheral edge portion of the first fixed member, the distal end opening of the cylindrical portion is blocked off by an end cover, and the motor rotor and motor stator can be arranged in the space blocked off by the end cover.

DESCRIPTION OF THE EMBODIMENTS

Figure 1:
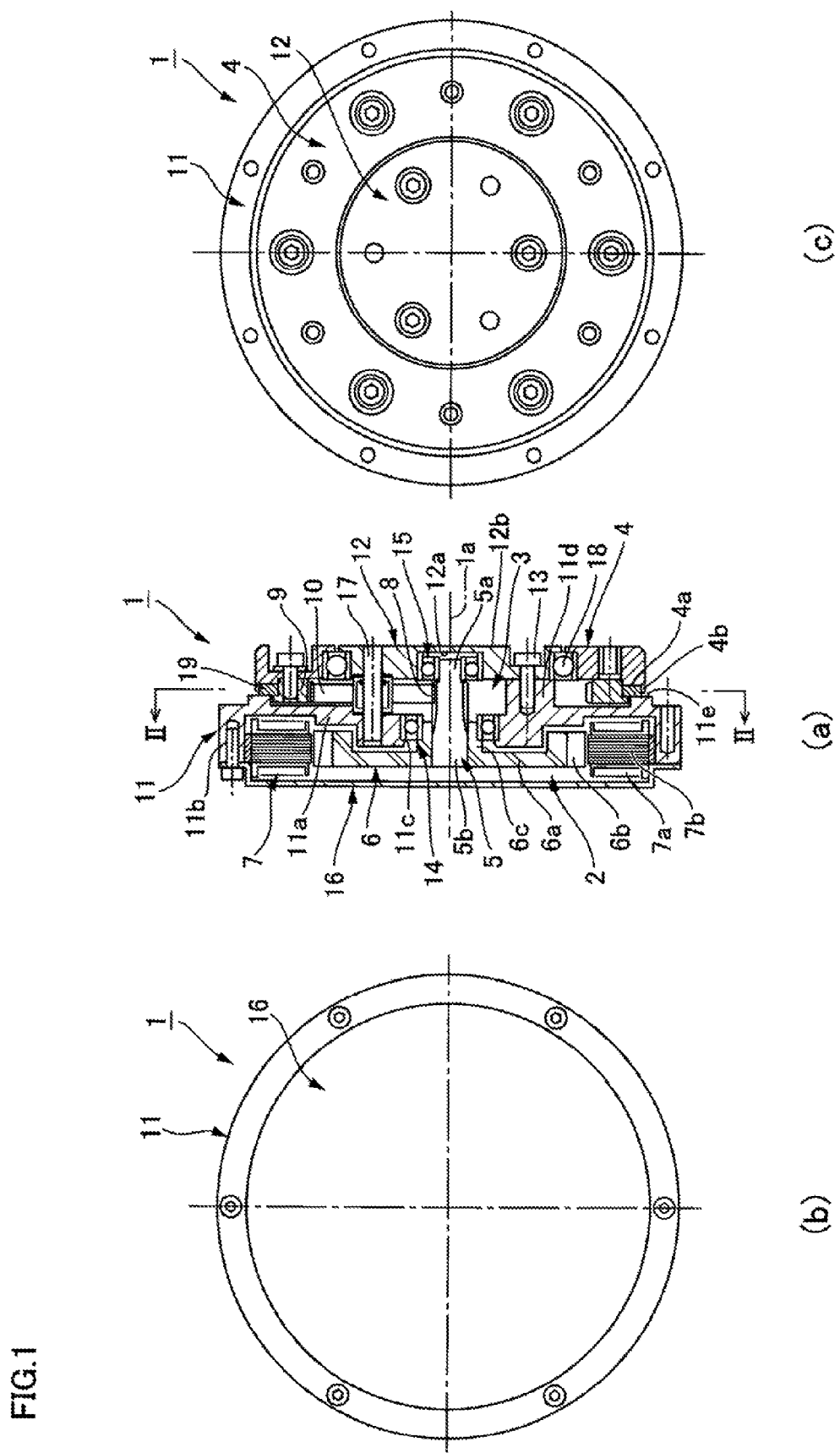
FIGS. 1(a) through 1(c) a longitudinal sectional view of a rotation actuator in which the present invention has been applied, an end face view from the motor side, and an end face view from the reduction gear side.

An embodiment of a rotation actuator to which the present invention has been applied is described below with reference to the drawings.

FIG. 1(a) is a longitudinal sectional view of the rotation actuator according to the present embodiment, FIG. 1(b) is an end face view of the motor side thereof, and FIG. 1(c) is an end face view of the reduction gear side thereof. The rotation actuator 1 is provided with a motor 2 and a reduction gear 3 coaxially disposed adjacent to each other along the direction of the center axis 1a. A coaxially disposed annular rotation output plate 4 is provided to the side of the reduction gear 3 opposite from the motor 2.

The motor 2 is of an inner-rotor type and is provided with a rotating shaft 5, a motor rotor 6 coaxially fixed to a trailing-end part 5b of the rotating shaft 5, and a motor stator 7 that surrounds the external periphery of the motor rotor 6 in a coaxially state across a fixed gap. The reduction gear 3 is a planetary reduction gear and is provided with a sun gear 8 formed on the external peripheral surface of the rotating shaft 5, an annular internally toothed gear 9 that coaxially surrounds the sun gear 8, and a planetary gear 10 that is disposed between the sun gear 8 and the internally toothed gear 9 and that meshes with both of these gears. The rotation of the rotating shaft 5, which is a motor shaft, is reduced via the reduction gear 3 and outputted from the rotation output plate 4.

Figure 2:
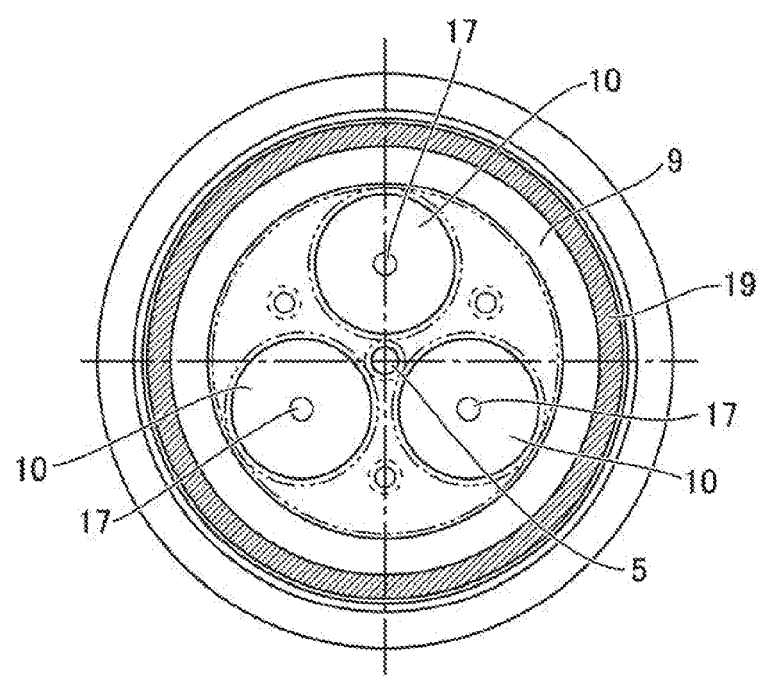
FIG. 2 is a schematic cross-sectional view of the rotation actuator sectioned along line II-II in FIG. 1.

FIG. 2 is a schematic cross-sectional view of the rotation actuator 1 sectioned along line II-II in FIG. 1(a). The internal structure of the rotation actuator 1 will be described with reference to FIGS. 1 and 2.

The rotation actuator 1 is provided with a first fixed disc 11, which is the first fixed member, and a second fixed disc 12, which is the second fixed member. The first fixed disc 11 is provided with a disc-shaped partitioning plate portion 11a for partitioning the space between the motor 2 and the reduction gear 3. A cylindrical part 11b that functions as a stator yoke protruding to the opposite side from the reduction gear 3 along the direction of the center axis 1a is formed on the external peripheral edge part of the partitioning plate portion 11a. A circular center through-hole 11c is formed in the center portion of the partitioning plate portion 11a. Columnar projections 11d for use as spacers that protrude to the second fixed disc 12 side are formed at equidistant intervals about the center axis 1a on the partitioning plate portion 11a.

The second fixed disc 12 is smaller in diameter than is the first fixed disc 11, and a circular concavity 12a open to the first fixed disc 11 side is formed in the center portion of the second fixed disc. The second fixed disc 12 is fastened and fixed to the first fixed disc 11 by three fastening bolts 13 mounted from the outside end face 12b side in a state of being superimposed on the distal end face of the three columnar projections 11d of the first fixed disc 11. A fixed-width gap is formed by the columnar projections 11d between the first and second fixed discs 11, 12.

The rotating shaft 5, which rotates about the center axis 1a, passes through the center portion of the first and second fixed discs 11, 12, which are fastened and fixed at constant intervals. The rotating shaft 5 passes through the center through-hole 11c of the first fixed disc 11, and the leading-end part 5a of the rotating shaft extends into the concavity 12a of the second fixed disc 12. The trailing-end part 5b side of the rotating shaft 5 protrudes from the center through-hole 11c to the opposite side from the second fixed disc 12.

A first roller bearing 14 is mounted between the external peripheral surface of the trailing-end part 5b of the rotating shaft 5 and the circular internal peripheral surface of the center through-hole 11c in the first fixed disc 11. A second roller bearing 15 is mounted between the external peripheral surface of the leading-end part 5a of the rotating shaft 5 and the circular internal peripheral surface of the concavity 12a in the second fixed disc 12. The rotating shaft 5 is rotatably supported via the first and second roller bearings 14, 15 by the first and second fixed discs 11, 12 that are fastened and fixed with each other.

The motor 2 is next described. The trailing-end part 5b of the rotating shaft 5 protrudes a predetermined distance from the center through-hole 11c in the first fixed disc 11 in the opposite direction from the second fixed disc 12. The motor rotor 6 is coaxially fixed to the trailing-end part 5b. The motor rotor 6 is provided with a discoid rotor yoke 6a and a rotor magnet 6b fixed to the circular external peripheral surface of the rotor yoke 6a. A cylindrical boss 6c is formed in the center portion of the rotor yoke 6a. The trailing-end part 5b of the rotating shaft 5 is press-fitted and fixed into the circular through-hole of the boss 6c. The first roller bearing 14 is mounted on the external peripheral surface of the boss 6c and rotatably supports the trailing-end part 5b of the rotating shaft 5 via the boss 6c.

The motor stator 7 is disposed in a state surrounding the circular external peripheral surface of the rotor magnet 6b from the outside in the radial direction across a fixed gap. The motor stator 7 is provided with the cylindrical part 11b (stator yoke) formed on the first fixed disc 11, a plurality of salient poles 7a protruding from the cylindrical part 11b inward in the radial direction at fixed angular intervals, and drive coils 7b of each phase wound onto the salient poles 7a.

A discoid motor end cover 16 is fixed to the annular end face of the cylindrical part 11b. The motor rotor 6 and motor stator 7 are positioned in the space surrounded by the first fixed disc 11 and the motor end cover 16.

The reduction gear 3 is next described. The sun gear 8 of the reduction gear 3 is formed on the external peripheral surface of the shaft portion of the rotating shaft 5 positioned between the first and second fixed discs 11, 12. Three planetary shafts 17 bridge the space between the first and second fixed discs 11, 12 in the direction parallel to the center axis 1a so as to coaxially surround the sun gear 8. The planetary shafts 17 are disposed in the circumferential direction so as to be positioned between the columnar projections 11d. A planetary gear 10 is rotatably supported on each of the planetary shafts 17. The annular internally toothed gear 9 is disposed on the radial-direction outside of the planetary gears 10. The internally toothed gear 9 is coaxially fixed to the annular rotation output plate 4, which is adjacently disposed on the opposite side from the first fixed disc 11.

The rotation output plate 4 is disposed in a state surrounding the second fixed disc 12 from the external peripheral side. A third roller bearing 18 is mounted between the circular external peripheral surface of the second fixed disc 12 and the circular internal peripheral surface of the rotation output plate 4. The rotation output plate 4 is rotatably supported by the second fixed disc 12 by the third roller bearing 18.

A sliding ring 19 is mounted between the rotation output plate 4 and the first fixed disc 11. The rotation output plate 4 is supported by the first fixed disc 11 from the center axis 1a direction, with the sliding ring 19 interposed therebetween. The sliding ring 19 seals the gap between the rotation output plate 4 and the first fixed disc 11, and prevents grease from flowing out from the reduction gear 3 to the exterior.

More specifically, an annular end face 4a that faces the first fixed disc 11 is formed on the external peripheral edge part of the rotation output plate 4. A cylindrical projection 4b that protrudes toward the first fixed disc 11 side is formed on the external peripheral edge of the annular end face 4a. An annular projected face 11e that protrudes toward the annular end face 4a is formed on the first fixed disc 11 side.

A sliding ring 19 having a rectangular cross section is mounted on the inner side the cylindrical projection 4b between the annular projected face 11e of the first fixed disc 11 and the annular end face 4a of the rotation output plate 4 facing the annular projected face. A very small gap is present between the annular projected face 11e and the cylindrical projection 4b, and the gap between the annular projected face 11e on the inner side of the cylindrical projection and the annular end face 4a is sealed by the sliding ring 19.

The sliding ring 19 is fixed on, e.g., the rotation output plate 4 side, and slides along the annular projected face 11e of the first fixed disc 11 as the rotation output plate 4 rotates. Therefore, the sliding ring 19 is preferably formed from a material having a low friction coefficient so that the sliding resistance against the annular projected face 11e of the first fixed disc 11 is as low as possible, and is preferably formed from a material having low sliding friction and high abrasion resistance. It is possible to use a plastic or ceramic material having such low abrasion resistance and a low friction coefficient.

In the rotation actuator 1, the motor 2 is rotatably driven to cause the rotating shaft 5 to rotate at high speed. The high speed of the rotating shaft 5 is reduced by the reduction gear 3, and the internally toothed gear 9, which is an output component of the reduction gear, rotates at reduced speed. Hence, reduced rotation is outputted to a load (not shown) from the rotation output plate 4, which is fixed to the internally toothed gear 9.

In the example described above, an planetary reduction gear is used as the reduction gear 3. A Cyclo® reduction gear, RV reduction gear, or the like may be used as the reduction gear 3.

The invention claimed is:

1. A rotation actuator comprising:
   a first fixed member and second fixed member fixed to each other across a predetermined gap in a center axis direction;
   a rotating shaft that passes through the first fixed member in the center axis direction, a leading-end part of the rotating shaft extending to the second fixed member;
   a first bearing mounted between the first fixed member and the rotating shaft, the first bearing rotatably supporting the rotating shaft on the first fixed member;
   a second bearing mounted between the second fixed member and the leading-end part of the rotating shaft, the second bearing rotatably supporting the rotating shaft on the second fixed member;
   a motor rotor fixed to a trailing-end part of the rotating shaft, the trailing-end part protruding toward a side opposite to the second fixed member;
   a motor stator fixed to a portion of the first fixed member located on an opposite side from the second fixed member, the motor stator surrounding an external periphery of the motor rotor across a fixed gap;
   a rotation output member for surrounding an external periphery of the second fixed member;
   a third bearing mounted between the second fixed member and the rotation output member, the third bearing rotatably supporting the rotation output member on the second fixed member;
   a reduction gear mechanism incorporated between the first fixed member and the second fixed member, the reduction gear mechanism reducing rotation of the rotating shaft and transmitting reduced rotation to the rotation output member;
   a sliding bearing mounted between the rotation output member and the first fixed member so as to support the rotation output member in a rotatable manner on the first fixed member in the center axis direction; and
   wherein the reduction gear mechanism has:
   a sun gear formed on an external peripheral surface of a shaft portion of the rotating shaft, the shaft portion being positioned between the first and second fixed members;
   a planetary gear supported in a rotatable manner by a planetary shaft bridged between the first and second fixed members, the planetary gear meshing with the sun gear; and
   an internally toothed gear that is positioned between the rotation output member and the first fixed member, is fixed to the rotation output member, and meshes with the sun gear.

2. The rotation actuator according to claim 1, wherein the sliding bearing is a sliding ring that is slidably mounted in a gap between the rotation output member and the first fixed member so as to surround the internally toothed gear, and the gap is sealed by the sliding ring.

3. The rotation actuator according to claim 1, further comprising:

a cylindrical portion that is formed on an external peripheral edge portion of the first fixed member, and protrudes toward a side opposite to the second fixed member; and an end cover for covering a distal end opening of the cylindrical portion, wherein the motor rotor and the motor stator are arranged in a space surrounded by the first fixed member and the end cover.

4. The rotation actuator according to claim 2, further comprising:

a cylindrical portion that is formed on an external peripheral edge portion of the first fixed member, and protrudes toward a side opposite to the second fixed member; and an end cover for covering a distal end opening of the cylindrical portion, wherein the motor rotor and the motor stator are arranged in a space surrounded by the first fixed member and the end cover.

* * * * *